(12) United States Patent
Rosaria et al.

(10) Patent No.: US 7,475,289 B2
(45) Date of Patent: Jan. 6, 2009

(54) TEST MANAGER

(75) Inventors: Steven Rosaria, Redmond, WA (US);
Barry Webberley, Seattle, WA (US);
Michael P Corning, Woodinville, WA (US); Roger Porter, Duvall, WA (US);
Glenn LaVigne, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 11/056,052

(22) Filed: Feb. 11, 2005

(65) Prior Publication Data

US 2006/0184918 A1 Aug. 17, 2006

(51) Int. Cl.
*G06F 11/00* (2006.01)
(52) U.S. Cl. ........................................... 714/38
(58) Field of Classification Search .................. 714/38; 717/124–126
See application file for complete search history.

(56) References Cited

U.S. PATENT DOCUMENTS 6,334,096 B1 * 12/2001 Hiroshige et al. ........... 702/182
6,442,714 B1 * 8/2002 Griffin et al. .................. 714/46
6,859,893 B2 * 2/2005 Hines ........................... 714/38
7,055,067 B2 * 5/2006 DiJoseph ..................... 714/38
7,113,883 B1 * 9/2006 House et al. ................ 702/122
2001/0012986 A1 * 8/2001 Conan et al. ................ 702/188
2002/0188890 A1 * 12/2002 Shupps et al. ................. 714/38

* cited by examiner

*Primary Examiner*—Bryce P Bonzo
(74) *Attorney, Agent, or Firm*—Lee & Hayes, PLLC (57) ABSTRACT

An exemplary computer-implementable method includes receiving a test specification document file for a software product wherein the test specification document file includes mark-up language, calling for storage of the test specification document file in a test database, parsing the mark-up language, creating test information for manual test variations based at least in part on the parsing of the mark-up language, outputting a list of at least some of the manual test variations, receiving manual test result information based on execution of at least one of the manual test variations on the software product and calling for storage of the manual test result information in the test database. Various other exemplary methods, devices, systems, etc., are also disclosed.

18 Claims, 9 Drawing Sheets

TEST MANAGER

TECHNICAL FIELD

Subject matter disclosed herein relates generally to managing manual tests of software code.

BACKGROUND

Software development is typically an ongoing process that can extend over a period of years. During software development, software engineers may test or revise software code. Revised code or builds may perform differently, include new features or no longer support old features. Test specifications should account for such changes where necessary or desired. Further, test specifications should be linked to test results to provide a complete historical record of the software development process. While tools exist to develop or update test specifications, a need exists for better management of tests, especially manual tests performed by testers or software developers.

Various exemplary methods, devices, systems, etc., described herein pertain to management of tests, including management of test data. Such exemplary technology is particularly suited to managing manual tests and results thereof.

SUMMARY

The techniques and mechanisms described herein are directed at management of manual tests for software products. An exemplary computer-implementable method includes receiving a test specification document file for a software product wherein the test specification document file includes mark-up language, calling for storage of the test specification document file in a test database, parsing the mark-up language, creating test information for manual test variations based at least in part on the parsing of the mark-up language, outputting a list of at least some of the manual test variations, receiving manual test result information based on execution of at least one of the manual test variations on the software product and calling for storage of the manual test result information in the test database. Various other exemplary methods, devices, systems, etc., are also disclosed.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 7 is an exemplary screen shot of a user interface for managing tests, in particular, to aid in filtering test variations.

FIG. 8 is an exemplary screen shot of a user interface for managing tests, in particular, to serve as a signup sheet for testers.

FIG. 9 is an exemplary screen shot of a user interface for managing tests, in particular, to serve as a results acceptor or submission sheet for testers.

FIG. 10 is an exemplary screen shot of a user interface for managing tests, in particular, to display test information and/or results of test analyses.

DETAILED DESCRIPTION

As mentioned in the Background section, tools exist to develop or update test specifications. Such tools are typically designed for software testers and their managers. As described in more detail further below, a test management system requires some degree of interoperability with a test specification tool or, at least, with the output thereof. An understanding of a particular tool, referred to as "SQRTS-.NET" (Microsoft Corporation, Redmond, Wash., sometimes referred to as "Socrates") will help establish a foundation upon which a test management system may operate.

The SQRTS.NET test specification tool helps testers write test specifications in a highly structured, yet very flexible way. SQRTS.NET uses an extensible mark-up language, XML, which is a subset of the Standard Generalized Markup Language (SGML). Use of XML facilitates production of test specifications in a flexible and common information format that can be shared on the World Wide Web, intranets, and elsewhere.

Figure 1:
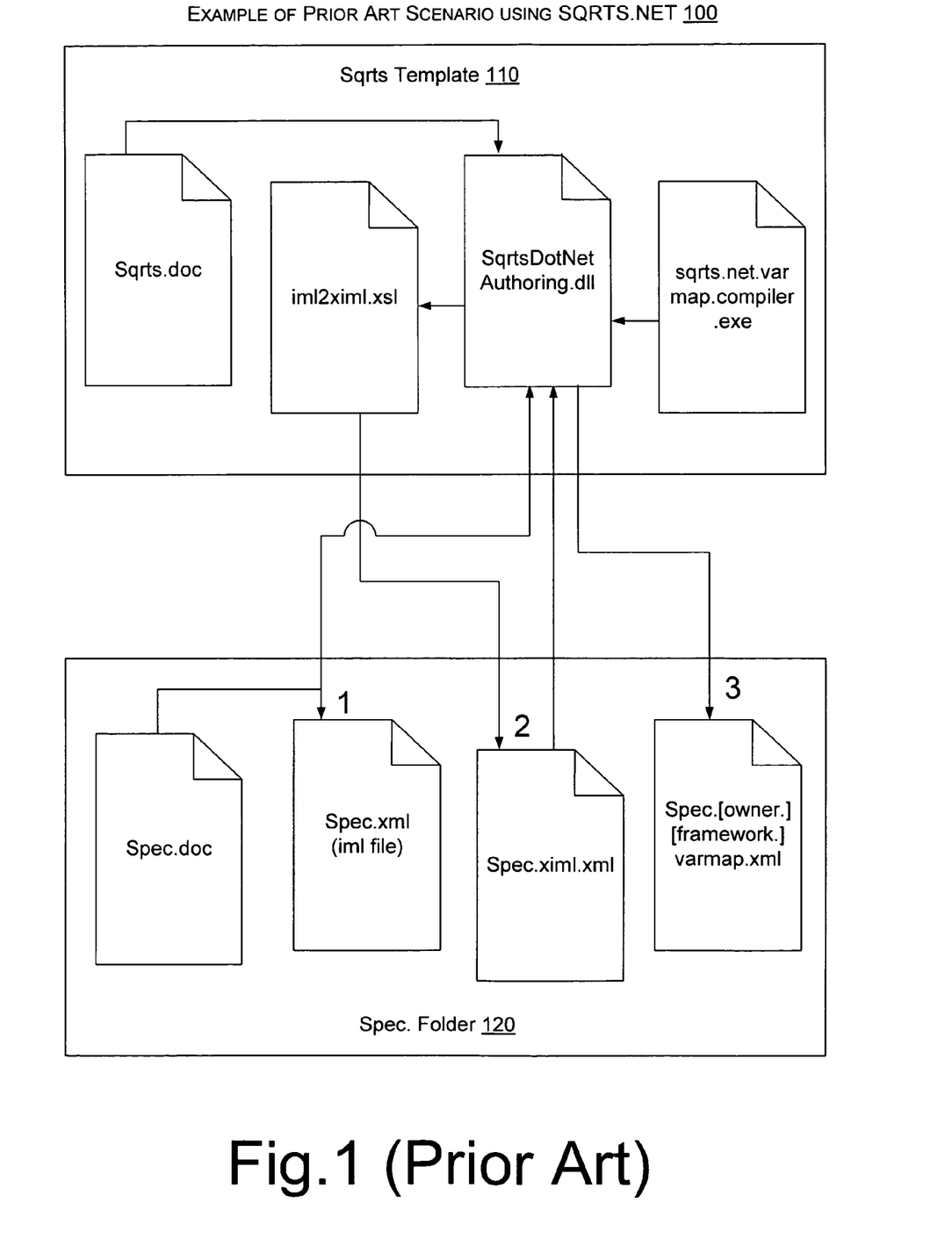
FIG. 1 is an example of a prior art scenario for producing a test specification.

FIG. 1 shows an exemplary scenario 100 for production of a test specification using the SQRTS.NET tool. The scenario 100 includes a template block 110 and a specification block 120. The exemplary scenario 100 illustrates a process whereby the content of a word processing document "Sqrts-.doc" is serialized to XML, which, for manual tests, includes instructions for executing tests. In this example, a word processor can serve as an XML editor. With respect to data associated with the XML, i.e., XML data, data can include class names of a test code, which can serve as a precautionary measure. For example, in the case that the test specification and the executable test code are not synchronized, testing may be avoided or prohibited.

In the case that a test fails, an XML-based failure manager can display and describe to a test run investigator the relevant part of the actual test specification that failed along with an expected result. Thus, the SQRTS.NET tool can reduce the time required to debug failures and enable testers (e.g., who were not the authors of the test) to execute the tests, investigate failures, and enter bugs against a product code. The SQRTS.NET tool benefits test managers because reports of designed, implemented, and executed tests are free: reports are an XSL transformation of the XML that drives the tests.

Particular features of the SQRTS.NET tool include: a user interface that uses objects to capture test data in a way to facilitate serialization to XML; an XML compiler that serializes document content to XML; another XML compiler that processes the first XML into XML formats suitable for test code automation and Web form rendering (for automated and manual tests, respectively); an HTML version of a specification (e.g., similar in appearance to the original document) that transforms the specification's XML into HTML; browser-based, form-based and XML Web service-based form factors for rendering manual tests and recording results of executing those manual tests; and integration with test failure management software to allow investigators to examine test specification data for failed (automated or manual) test variation.

With respect to workflow, a tester can begin a test engagement by describing tests in terms of sets, levels, and variations. A SQRTS.NET test specification also provides a table to specify which sets belong to which test executable and a table to specify which sets use which classes to execute common setup and cleanup operations. A tester may specify runtime data either by listing arguments that a test variation inputs along with the possible values of each argument, or by specifying each argument's value for each variation. In the former case, the SQRTS.NET tool generates a number of test cases equal to the cross product of the number of arguments times their possible values. In the latter case, the SQRTS.NET tool generates a number of test cases equal to the number of explicit sets of input data.

Once set up, generation of an HTML copy of the document and an XML file representing all of the data entered in the specification occurs. The particular XML vocabulary is referred to herein as the "intermediate markup language" (IML) and serves a purpose for the test executable that is somewhat analogous to the purpose of the Intermediate Language (IL) for the Common Language Runtime (CLR) of the .NET™ framework (Microsoft Corporation, Redmond, Wash.). Once a tester has completed editing the IML, generation of full test case data occurs where a set of tests may result that has far more actual tests may be immediately apparent from the specified tests. The expanded IML file is referred to as "XIML". The SQRTS.NET tool can automatically process the XIML one more times into individual XML files called "varmaps".

Once the tester has written the test implementation code, the tester can edit the specification with the names of classes that implement each test variation. In addition, the tester can edit the specification that ultimately adds or modifies attributes on the XML nodes that activate and deactivate tests (e.g., based on the status of bugs previously found in the software under test). Finally, a tester can assign different owners to different test executables.

In an automated procedure, execution of the tests proceeds by running the varmap files generated by the XML compilers. Each variation specifies which class to run and what data to use. In this way only specified classes run resulting in synchronization between the test specification and the executable. As for manual tests, the SQRTS.NET tool can render these in Web forms with, for example, radio buttons for pass or fail on each variation. Steps detailed in the test specification appear on the Web form to facilitate manual testing by a tester. Interaction between a tester and the Web form (e.g., clicking a Web form radio button) can update the manual test's varmap file. When implemented as an XML Web service, such varmap files can serve multiple users so that more than one tester can run the manual tests. Further, in a multi-tester environment, every time a tester updates the varmap, the SQRTS.NET tool re-renders the Web form from the varmap to thereby allow the testers to see changes made by any of the testers.

Referring again to the exemplary scenario 100 of FIG. 1, a three step process (labeled 1, 2, 3) is illustrated that serializes binary content from a word processor document into an XML format suitable for use by test code execution engines. The SQRTS.NET tool architecture relies on the component labeled "SqrtsDotNetAuthoring.dll" of the SQRTS Template block 110. This particular dynamic link library (.dll) component is called by both the word processor (e.g., WORD 2002 software, Microsoft Corporation, Redmond, Wash.), specifically by the sqrts.dot template and optionally by a .NET™ framework executable called "sqrts.net.varmap.compiler.exe". The SqrtsDotNetAuthoring.dll component converts the binary content of the document "Sqrts.doc" to IML (step 1 in FIG. 1) where IML is an XML schema. The IML may contain XML nodes that represent multiple test cases for a given test variation. Thus, the .NET™ framework component allows for processing of the IML to expand all tacit test cases into explicit variations "vars" (step 2 in FIG. 1).

In some cases, the expanded IML ("Spec.ximl.xml") may not yet be suitable for consumption by a test code framework; for example, the XIML file may contain multiple varmap nodes (one or more for automated tests and one or more for manual tests). Therefore, a final step (step 3 in FIG. 1) occurs whereby the .NET™ component uses managed XML to save each automated test varmap node to a separate file, leaving all manual test varmap nodes in the XIML file.

To summarize, content in a document passes through an XML pipeline being changed along the way by a series of XSLT and managed XML files. The process produces three XML files, each with a different purpose. The first XML file is a direct serialization of the content; the second XML file expands some of the first XML into much more test data than was entered in word processor document; and the third file is in a format suitable for execution by software test automation. The SQRTS.NET tool uses loosely-coupled technology to tightly bind test specifications to test executables.

Figure 2:
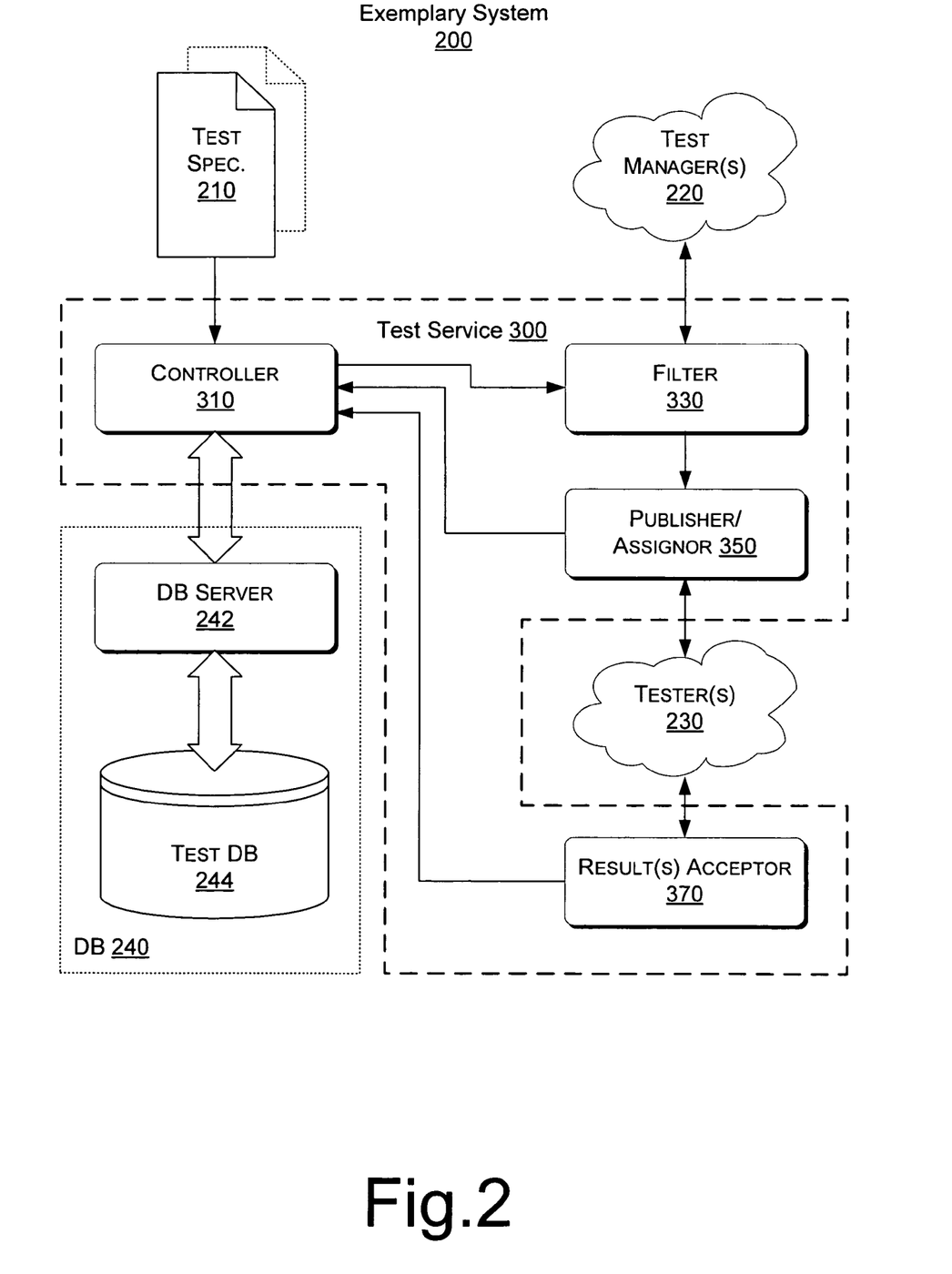
FIG. 2 is a block diagram of an exemplary system that includes an exemplary test service for managing software development tests.

The description of the SQRTS.NET tool demonstrates various features associated with software testing. In particular, it demonstrates various features of a test specification used in performing manual tests. FIG. 2 shows an exemplary system 200 that includes a test service 300 that can help manage software testing based on one or more test specifications, which may be included in a test specification file.

The exemplary system 200 includes one or more test specifications 210 (e.g., test specification document file, etc.), one or more test managers 220, one or more testers 230, a database system 240 and importantly an exemplary test service 300. In FIG. 2, a dashed line encompasses various components of the test service 300 while a dotted line encompasses various components of the database system 240. An example of a test specification 210 has already been described above along with the roles of test managers 220 and testers 230. The database system 240 may include a server (i.e., DB server 242) and storage (i.e., test DB 244). The server 242 may be an SQL server or other type of server.

According to the exemplary system 200, the test service 300 operates in conjunction with the one or more test specifications 210, the one or more testers 230 and the database system 240. While one or more test managers 220 are included in the exemplary system 200, the test service 300 may operate without such managers. The exemplary test service 300 includes a controller 310, a filter 330, a publisher/assignor 350 and a results acceptor 370. The controller 310, which may be a Web service, controls data flow throughout the test service 300. In particular, the controller 310 controls data organization and data flow to the database system 240. In general, the controller 310 responds to input of a test specification, input of a change in a test specification (e.g., a new test specification) and input of test results, for example, by a tester. The controller 310 may optionally respond to a test manager as well and/or to input of ownership or other information by a tester or test manager.

With respect to workflow, in an exemplary scenario, the controller 310 receives a test specification 210. The controller 310 then parses the test specification 210 for relevant test information. The controller 310 may also create test variations based on the relevant test information and/or interact with the database system 240. For example, a test specification may include mark-up language, which upon parsing, causes the controller 310 to parse variations and create records for the variations in the database system 240.

After or during parsing of the test specification, the controller 310 communicates at least some test information to a filter component 330. For example, if the controller 310 creates test variations and then compares the test variations with information stored in the test database 244, the controller 310 may decide to ignore some of the test variations and, hence, not communicate the test information for these test variations. In the example of FIG. 2, the controller 310 may refrain from communicating test information for some test variations to the filter component 330. Alternatively, or in addition to, the controller 310 may rely on information from the test database 244 in creating test information for test variations. For example, the controller 310 may decide to ignore certain mark-up language that calls for test variations that have already been performed, that are otherwise redundant or are no longer relevant.

As shown the exemplary test service 300, the filter component 330 filters the received test information for test variations, optionally with input from a test manager 220. In some cases, the filter component 330 may not filter test information received from the controller 310 or the filter may not alter the received test information. In any instance, the filter component 330 provides test variation information to a publisher/assignor 350 component. One or more testers 230 interact with the publisher/assignor component 350, perform tests according to the test variation information, and, during or after performing a test, input test result information via the results acceptor component 370 component.

The results acceptor component 370 communicates results information to the controller 310 to thereby allow for management of results that correspond to the test variations of the test specification 210. Further, the publisher/assignor component 350 may optionally communicate ownership information to the controller 310 or, as an alternative or in addition to, the results acceptor component 370 may communicate ownership information to the controller 310. Test ownership information (such as which tester is to execute which test) may also be authored in the test specification 210.

Thus, as shown in FIG. 2, the exemplary test service 300 may facilitate tracking of progress and status of manual tests, noting that while manual tests are mentioned, a test service may receive a test specification with a mix of automated and manual tests whereby a controller identifies manual tests for further processing.

The exemplary test service 300 may receive a test specification document file for a software product wherein the test specification document file includes mark-up language, call for storage of the test specification document file in a test database, parse the mark-up language, create test information for manual test variations based at least in part on the parsing of the mark-up language, output (e.g., publish) a list of at least some of the manual test variations, allow testers to sign-up for one or more of the manual test variations, receive manual test result information based on execution of at least one of the manual test variations on the software product and call for storage of the manual test result information in the test database. The exemplary test service 300 may perform other exemplary methods. Some exemplary methods are described below with reference to scenarios that may occur during software product testing.

In an exemplary scenario, a test specification received by an exemplary test service defines a manual test run spanning a specific date range. In response, the exemplary test service imports a number of specifications for the manual test run. A filter component of the test service then filters out a subset of test variations that should be executed for each specification and a publisher component publishes the subset as a signup sheet through which testers can then take ownership of the individual test variations.

In this exemplary scenario, when the manual tests have been run, the respective test executors can access a Web page to submit pass/fail results or other test result information. A tester or a test manager may also view the rate of participation (i.e. what percentage of tests has been signed up for) and pass/fail rates for a particular specification. The exemplary test service may optionally transform the manual test results to format used for automated test logs and export the manual results to a test database, so that the status of manual tests is consolidated with all other test reporting.

Another exemplary scenario includes initiation of a complete test pass. In this scenario, a test manager creates a manual test pass by providing a title, description, start/end dates, and a default build number for the software to be tested. Next, the manager adds specifications pertaining to tests to be executed for the complete test pass. For each specification in the test pass, the manager filters out which variations need to be executed (e.g., per the filter 330 of FIG. 2), publishes each specification in the form of an interactive Web-based signup sheet and sends out via email a link (e.g., a URL) to the Web-based signup sheet (e.g., per the publisher 350 of FIG. 2). Testers can access the Web-based signup sheet and take ownership of variations, for example, by entering an email alias in a field (e.g., a text box). The ownership information is optionally communicated to a controller (e.g., the controller 310 of FIG. 2), which can update a test database in real-time (e.g., the test DB 244 of FIG. 2).

Yet another exemplary scenario includes execution of manual tests and reporting or test results. In this scenario, after testers signup or have been assigned to one or more manual tests, they perform the manual tests according to the instructions specified in the manual test variations. An individual tester may either complete all tests and then submit the results, or submit results while executing the tests. To submit test results, a tester opens a Web-based signup sheet and clicks a submission button (e.g., per the results acceptor 370 of FIG. 2). Of particular utility in this exemplary scenario is information related to a tester's test platform. For example, at the time of signup or assignment, a tester enters, is assigned, or is otherwise associated with one or more test platforms, which may be inherent in the test variations.

An exemplary scenario may include entering product information such as product language, sku and license. Such information is particularly helpful for tracking testing of localized products and products that are released in multiple flavors. In the instance that a tester specializes in a particular product language, the tester may enter product information, which in turn, prompts an exemplary test service (e.g., the test service 300) to allow the tester to be associated only with variations that match the product information. An exemplary scenario optionally includes entering product and platform information simultaneously.

Test platform information may include specifics as to operating system, processor, memory, interfaces, etc. In the instance that a tester has limited platform access, the tester may enter the platform information, which, in turn, prompts the exemplary test service (e.g., the publisher/assignor 350) to allow the tester to be associated only with variations that match the platform information. For example, if the variation is for hypothetical OS-A and the tester has access to OS-B only, the test service will not allow the tester to signup for variations that require OS-B. In this scenario, an exemplary publisher component may display a page with only matching variations and appropriate buttons or fields for the matching variations that require input by the tester. Upon input by the tester, the test service (e.g., the test service 300 of FIG. 2) may cause a test database to be updated (e.g., the test DB 244 of FIG. 2). Table 1, below, includes some examples of platform, build or other information for an exemplary test service that can read files from a SQRTS.NET tool. Of course use of other tools, names, and values may be possible.

TABLE 1

Examples of Platform, Build and Other Information

| SQRTS.NET column name | Possible values |
| --- | --- |
| OSTobe | W2K, W2K3 (or NET), NT4, XP |
| OSVersion | ENT, SRV, PRO, WKS, ADS, PER, WEB |
| OSBuild | SP2, SP3, SP4, SP6, Latest |
| OSLang | DS, EN, DE, FR, IT, CN, TW, JA, KO, ES, PS |
| OSLocale | DS, EN, DE, FR, IT, CN, TW, JA, KO, ES, PS |
| License | Retail, Select, Eval, MSDN, OEM |
| ProductLanguage | DS, EN, DE, FR, IT, CN, TW, JA, KO, ES, PS |
| ProductBuildType | FRE, CHK, RETAIL, RETAIL-IA64, NONOPT, NONOPT-IA64, COVER, COVER-IA64, DEBUG-IA64, RELEASE, RELEASE-IA64 |
| Custom | Whatever values you specify up to 100 characters |

Another exemplary scenario involves aborting a manual test using an exemplary test service. In this scenario, midway through a "bug bash", a tester finds a showstopper bug. In turn, the tester submits test result information to the test service. The test service then causes a publisher component to issue an alert to all testers that calls off testing, for example, until the bug is fixed. In response to the alert, testers report to the test service any results collected up to receipt of the alert or a time specified in the alert.

In many cases, a fix changes the software product to an extent that a new test specification is required. Thus, after the test service aborts the manual test, the manager may change the test specification(s), cause the test service to receive and process the new test specification(s) and then create a new test pass. The manager may also repeat the regular test pass process of adding specifications, filtering variations (eliminating tests which were completed that do not need to be retested), and publishing the signup sheet using the test service. A manager may change a test specification in the after testing has started and add the new (or modified) test specification to the system. In response, an exemplary system may automatically copy the submitted information of the previous version of that specification to the new version of the specification and publish only those variations in the new the specification that were not present in the old specification. In general, publication may occur prior to release of a new software product build, coincident with release or shortly thereafter (e.g., optionally after the test that caused the abort has been successfully run by the same tester using an old or new variation).

Yet another exemplary scenario includes using an exemplary test service to perform statistical analysis of test information stored in a test database. In this scenario, the test database stores a file for every test specification received by the exemplary test service (e.g., optionally as a BLOB field. The storage of such information allows a manager to query the stored information and associate test result information with one or more test specification parameters. For example, a manager may use the test service to generate a report of test passes spanning a certain date range where the report presents a statistical analysis based on the historical state of one or more specifications.

Another exemplary scenario includes using an exemplary test service to manage long manual tests spanning multiple software product builds. In this scenario, for tests that take a relatively long time that they need to span multiple product builds, the product build number that a test variation was actually run on is entered as part of the pass/fail results information. An exemplary scenario optionally resets a default build number at the test pass level to the latest build number to be tested to thereby alleviate a need to manually enter a build number for each test variation.

Yet another exemplary scenario includes using an exemplary test manager to transfer test ownership. For example, tester Jane Doe signs up for a number of test variations and gets ready for a week-long manual test pass. However, she gets sick on the second day and is not able to finish her tests. In this scenario, the test service may query the tester via email or phone as to meeting a test time schedule or a test manager may communicate with the sick tester. In the former case, the test service may automatically communicate with available testers to transfer (i.e., reassign) test ownership. For example, the test service may send an email with a link to a Web-based signup sheet that indicates a need for transfer of ownership. In the latter case, a test manager may use or instruct the test service to send out a link to the signup sheet so that testers can signup for all the untested test variations the unavailable tester had intended to run.

Figure 3:
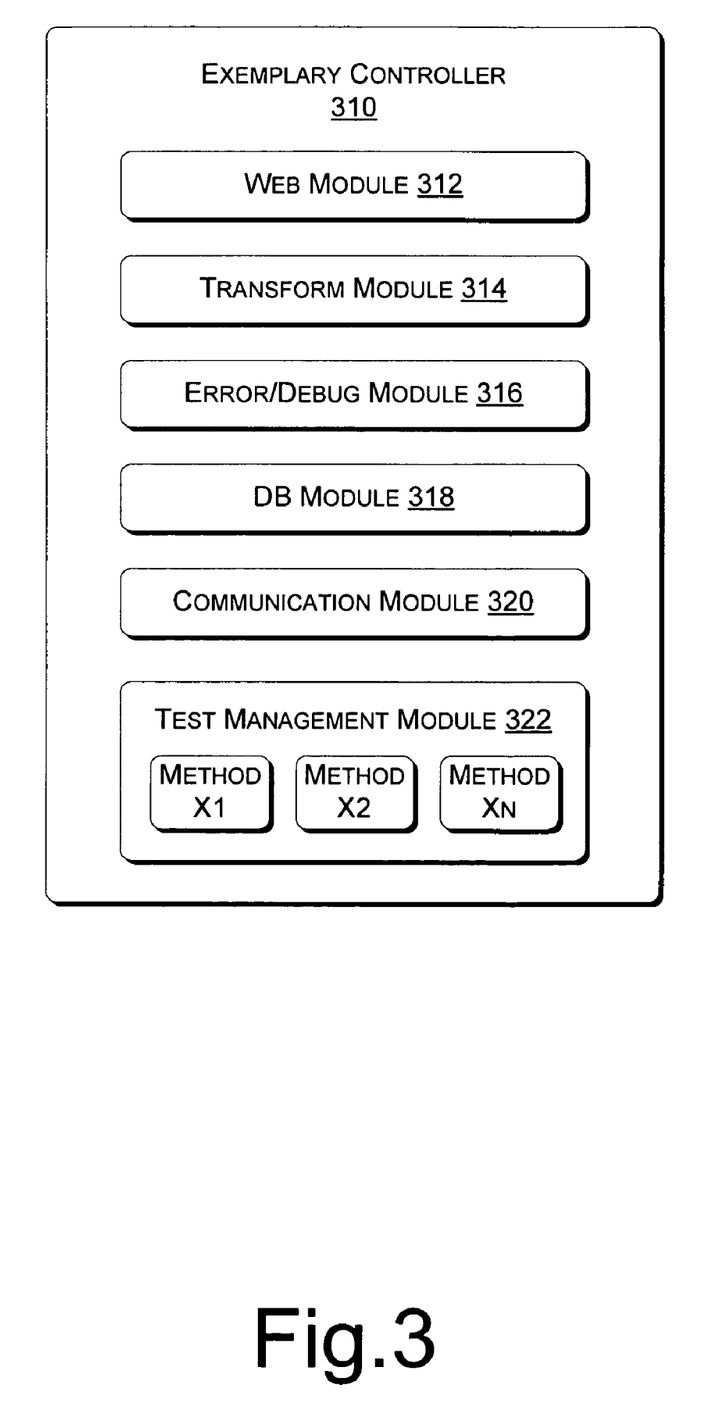
FIG. 3 is a block diagram of an exemplary controller for use in an exemplary test service.

FIG. 3 shows an exemplary controller 310 that may perform various actions germane to test management in an exemplary test service. The exemplary controller 310 includes a Web module 312, a transform module 314, an error/debug module 316, a DB module 318, a communications module 320 and test management module 322 with methods X1, X2 ... XN. Various aspects of a Web module 312, an error/debug module 316, a DB module 318 and a communications module 320 have been mentioned above. Further, various actions described above may rely on a transform module 314 and methods of a test management module 322.

In the exemplary controller 310, the transform module 314 allows for XSLT transforms. More specifically, an XSLT document defines rules for transforming a specific kind of XML document into another kind of document, where the rules are defined in XML-based document syntax. Thus, the transform module 314 allows web forms that deal with individual specifications to be rendered through an XSLT transform. Full test specification contents can be retrieved from a test database into a hidden text control and the relevant subset of the test specification can be extracted and augmented through a "SubsetofSpec.xslt" transform. This transform takes as parameters a list of variation nodes along with a variable describing the type of the current page. "SubsetofSpec.xslt" then keeps the execution details of only those variations specified in the node list and adds data to these variations depending on the type of page. This subset of the test specification may then be stored in a hidden text field; similarly, the actual transform may also be stored on the form itself. When the form loads, the transform renders the variations according to, for example, any currently set filtering criteria.

The resulting HTML of the transform, however, has no controls that are visible to ASP.NET. Thus, data submission is achieved by having JavaScript event handlers track controls whose contents have changed; this list of changed controls may be kept in a hidden text box (e.g., separated by semicolons). When a control changes its value, the entire list of changed controls is iterated and the XML to be submitted is handcrafted and stored inside another hidden text box; this second text box is an ASP.NET HTML control, and so it is visible to both JavaScript and ASP.NET. The form submission C# code then simply passes the contents of this text box to the appropriate test service method (e.g., a Web service method).

This particular exemplary process redirects all exceptions to an errors.aspx page (e.g., consider the error/debug module 316). This error reporting page can display appropriate error text for known exceptions that it can handle, and call stack and debug information otherwise. Per a communication module (e.g., the module 320), such error information can be sent via email to a test manager, a system developer or another administrator. In general, the email format is text to allow for display of all data. Note that since part of the debug information is the actual data being submitted, along with the URL, test pass ID, spec ID and other relevant data, the administrator can fix the problem and re-submit the user data on the user's behalf.

The test management module 322 includes various methods to aid in management of tests and associated data. In particular, where the test service receives test specifications from the SQRTS.NET tool, the following methods may be used by the exemplary controller 310.

int CreateManualTestPass(string title, string description, System.DateTime startDate, System.DateTime endDate, float productBuildNumber), which can create a new test pass and assign the test pass the specified values. This method returns the ID of the test pass just created.

ArrayList GetTestPass(int testPassID, string sortKey), which returns the details of a given test pass where if –1 is passed in, all test passes are returned. The sortKey is a column name by which to sort, where, if empty, the sort is assumed to be by TestPassID in descending order.

void UpdateManualTestPass(int testPassID, string title, string description, DateTime startDate, DateTime endDate, int defaultBuildNumber), which can be used to modify details associated with a test pass.

bool SpecHasPreviousRevisions(string specTitle, int testPassID), which returns true if the test specification title that the user is currently trying to add appears in the variations associated with the current test pass. Such information can be used to determine whether a brand new specification is being added or if an existing specification is being updated.

string GetPreviousSpecIDs(int testPassID, string specTitle), which returns a list of all specification IDs that have the given title in the specified test pass.

int AddSpec(int testPassID, string ximl), which checks whether the XIML already exists in a specifications table by calculating an MD5 hash (e.g., a message digest algorithm) of the specification's contents. If the XIML does not exist in the table, the method bulk imports the XIML as an unmodified text string into the specifications table; otherwise, the ID of the existing record is used. This method also inserts all variations of the particular specification along with pre-assigned test executors for the current test pass in a "SpecManualTests" table each time a specification is added, regardless of whether there already was an entry for that specification in the SpecManualTests table. The method returns the ID of the specification just created or retrieved.

When a specification has been published for a test pass and the specification changes, the specification may optionally be updated in an exemplary test service by re-importing the specification. In response, the method AddSpec will detect that a specification with the same title is being added and the method will assign the new version of the specification a new ID and copy all existing results from the old version of the specification to the new revision and finally delete the old data.

ArrayList GetTestPassSpecs(int testPassID) returns an array of all specification IDs associated with the specified test pass.

bool IsSpecPublished(int testPassID, int specID) returns true if the specification has at least one variation included in the test pass.

void RemoveSpec(int testPassID, int specID) removes all records with the specified TestPassID and SpecID from the SpecManualTests table if there are no results in those records. If the specification has any variations with results in it, an exception will be thrown.

object GetSpec(int specID) returns the specification title and contents for the specified ID.

string GetFilterData(int testPassID, int specID) returns an XML message containing publication information for each variation in the current test pass/specification.

void PublishSpec(int testPassID, int specID, string xmlIncludedVariations) sets an "IsVariationIncluded" bit to true for those variations specified in the XML message passed in.

string GetPublishedSpecVariations(int testPassID, int specID) is a method that for the specified test pass/specification, gets the published variations along with their test executors (e.g., testers) and manager-specified comments. If multiple test executors exist, they will be collapsed into the same node as one text string separated by semicolons.

void Signup(int testPassID, int specID, string ivarOffset, string testExecutor) is a method that assigns a tester as executor of a particular test pass/spec/variation triple. If the test executor already exists for this variation, this condition in effect acts as a signup removal and the "testExecutor" field will be set to empty. If an alias was removed from a multiple-executor variation, the corresponding record will be deleted as well from the SpecManualTests table.

void BulkSignup(int testPassID, int specID, string signup) processes a bulk signup, for example, by calling a Signup method multiple times.

string GetSpecVariationsByUser(int testPassID, int specID, string user) is a method whereby for a specified testpass/spec/user, returns the variations, manager-specified comments, and the user's results and notes as an XML message.

ArrayList GetResultIDs( ) returns the Result IDs and their meaning.

void UpdateResults(int testPassID, int specID, string ivarOffset, string testExecutor, float productBuild, int resultID, string notes, string os, string osVersion, string osBuild, string osLanguage, string license, string productLanguage, string productBuildType, int bugNumber, string signoffNotes, string custom), is a method called whenever a tester submits a variation test result. This method sets the result of the specified variation test to pass/fail or explicitly to not run. The test result itself is an integer because of the need for an explicit "not run" value (e.g., a Boolean value will not suffice this requirement because when the variation is first inserted, its initial value will be NULL). This method's parameters testPassID, specID, ivarOffset and testExecutor are used to identify a test record; the remaining parameters then update only those values that are set to a nonblank value for strings and a value other than −1 for numeric values. In other words, if updating only the product-Language field to "EN", all string fields will be set to a single space (" ") and the numeric fields (resultID, productBuild, and bugNumer) set to −1. If clearing a value occurs, it is set to an empty string for string fields ("") or −2 for numeric fields.

void BulkUpdateTestResults(int testPassID, int specID, string results) is a method that for a specified testpass/spec, updates the XML message passed in, for example, by calling the method "UpdateTestResults" multiple times.

string ResultStatsAllTestPasses( ) returns an XML message with various statistics for all test passes.

string ResultStatsPerTestPass(int testPassID) returns an XML message with various statistics for the test pass.

string ResultStatsPerTestSpec(int testPassID, int specID) returns the pass/fail info for the given specification.

string ResultStatsIncompleteVariations(int testPassID) returns an XML message with the results of variation tests that have not yet been run or that were blocked.

Figure 4:
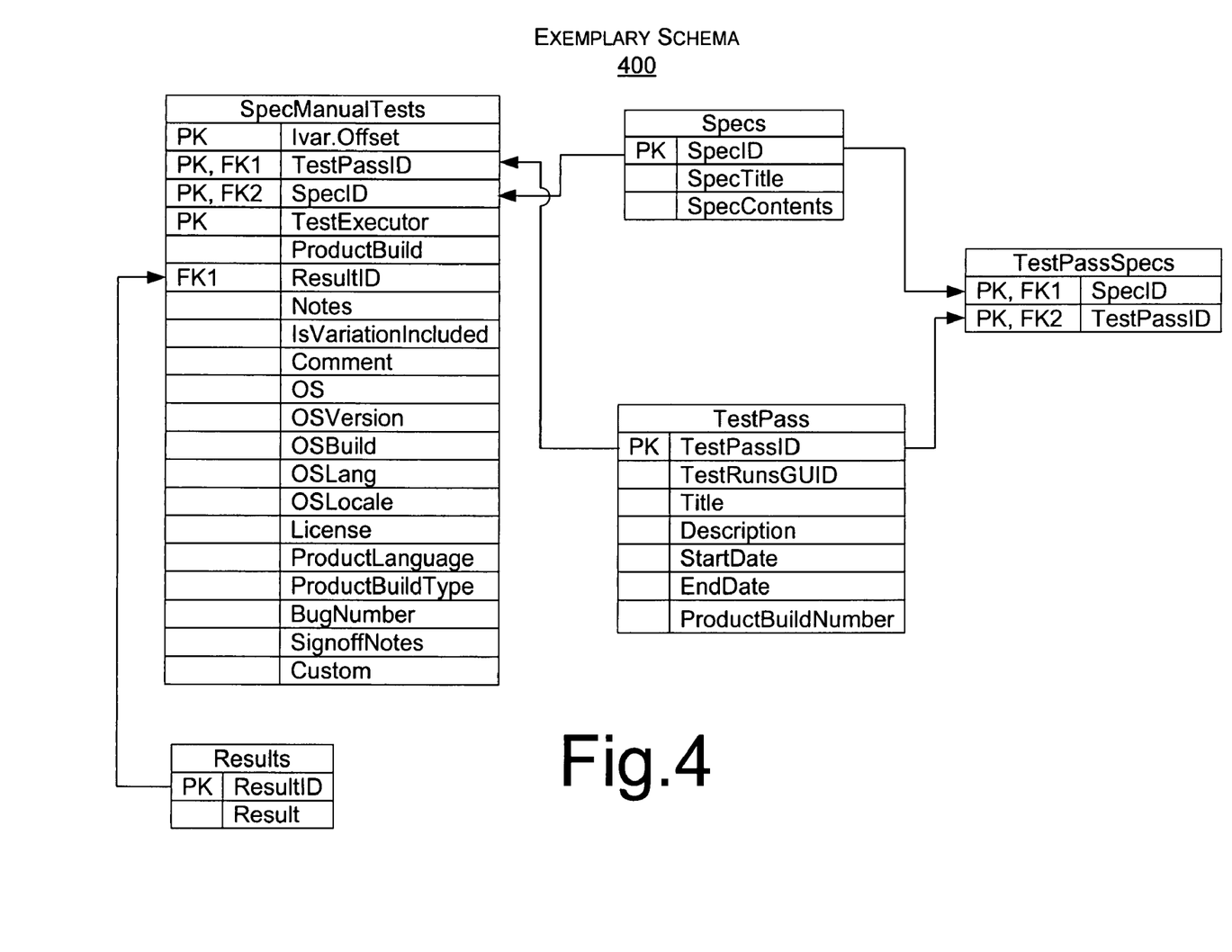
FIG. 4 is an exemplary schema for test information.

The foregoing exemplary methods rely on various parameters. These parameters may be structured in a form that facilitates analysis of information related to tests and stored in a test database. FIG. 4 shows an exemplary database schema 400 whereby parameters are structured in a relatively logical and efficient manner.

The exemplary schema 400 includes a SpecManualTests table, a Results table, a Specs table, a TestPass table and a TestPassSpecs table. In the schema 400, these five tables allow for efficient organization of test result information in association with specification information.

An exemplary test service (e.g., the test service 300 of FIG. 2) may rely on such a schema 400. For example, an exemplary test service may, upon adding specifications to a test pass, import the entire XIML into the SpecContents column of the Specs table as an unstructured text string, where it will remain unchanged (e.g., a BLOB field—a collection of binary data stored as a single entity). The purpose of storing this information is to provide variation details in various forms.

In execution, the XIML import process checks to see if a specification already exists in the test database; whereas, if a specification has not changed between test passes, it is not added again and the ID of the record currently in the test database is reused to optimize data storage. At the same time all individual variations of the specification are inserted one at a time into the SpecManualTests table, for example, as new records for the current test pass, and initially all variations are excluded from the current test pass.

The variation filtering process can set the IsVariationIncluded bit field accordingly for each variation in a given test pass upon publication of the specification, to the extent necessary. All variations in a specification should be stored so that the signup rate can be mapped to published variations as well as total test variations inside a specification for a test pass. In an example, a variation filtering process sets the IsVariationIncluded bit field for each variation that was published for execution in a particular test pass. During signup, the bit may be changed (e.g., from 0 to 1). A signup rate for the variations may be computed as the number of variations that have a non-NULL value in the test executor field, divided by the total number of variations that have the IsVariationIncluded bit field set to 1 or other non-NULL value, as appropriate.

The specification import process can recognize a number of data fields in the specification and insert data in the appropriate fields. The fields optionally include any of the names and values presented in Table 1, above.

An exemplary workflow process is illustrated below with reference to various user interfaces (e.g., Web forms or web pages) associated with an exemplary test service. In the exemplary workflow process, when a manual test pass is to be run, a test manager goes to a web page to create a new test pass and provides a date range and description of the test pass. The manager then specifies which manual test specifications are included in this test pass, along with the software product build to be tested.

Figure 5:
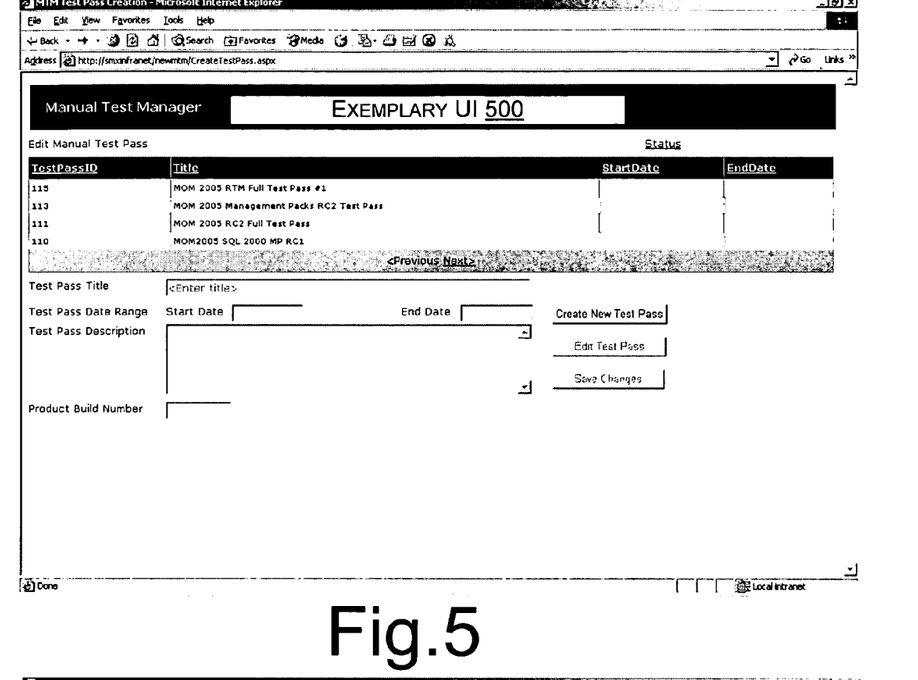
FIG. 5 is an exemplary screen shot of a user interface for managing tests, in particular, to aid in creation of a test pass.

FIGS. 5 through 11 are exemplary screenshots of UIs that may be used in a test pass creation procedure. In FIG. 5, a UI 500 appears that aids in the creation of a manual test pass. At the top of the UI 500, a grid displays all currently existing test passes. By selecting an item in the grid, the exemplary test service causes displays of associated details in the fields below, for example, so that they can be edited. A new entry is created by clicking, for example, the Create New Test Pass button, upon which an area is displayed where the specification author or manager can now add specifications to this test pass by specifying the filenames in the text box provided.

Figure 6:
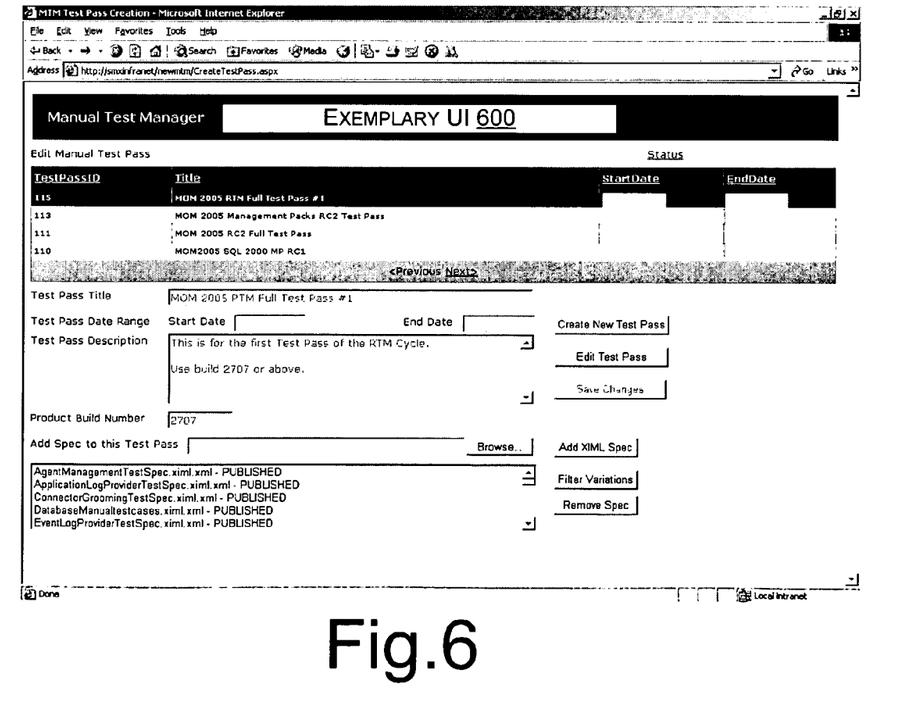
FIG. 6 is an exemplary screen shot of a user interface for managing tests, in particular, to aid in adding a specification to a manual test pass.

FIG. 6 shows a UI 600 that aids in adding a specification to a manual test pass. Specifications added to a test run can be inserted into a list box. A manager may also choose to remove a test specification from the test run currently being edited by selecting the desired specification in the list box and clicking the Remove Spec button. The specification title and relevant content are added to and removed from the current test run instantly.

After associating a test run with any number of test specifications, the content of each of these test specifications can be filtered (e.g., by a filter component) to manually or automatically select which subset of variations is to be executed. FIG. 7 shows a UI 700 that aids in filtering variations. In the UI 700, variations that are marked as disabled in the specification are not displayed. With respect to filtering variations, a number of criteria may be used; however, test categorization information should be supplied as part of the specification authoring process (i.e. in some sort of data table or as a context). With respect to the UI 700 of FIG. 7, to outright exclude a variation from being executed in the current test pass, a manager may uncheck a checkbox. Each variation is displayed with a hyperlink to show/hide its full details wherein the hyperlink is associated with the test database, which, as described above, may store the contents of the entire specification (e.g., a BLOB field).

A UI may include a text box for use in presenting late-breaking information to testers who will execute or are executing a test. For example, such a text box may notify testers that a test variation is blocked on a particular platform yet still executable on other platforms. In instances where a variation is excluded, a text box may present information as to why the variation was excluded or unpublished.

Once the proper subset of tests has been selected or "filtered", the manager clicks the Publish button at the upper right of the UI 700 and the exemplary test service generates a signup sheet for the currently displayed subset of variations (e.g., via a publisher component). The manager may send out a link to the published signup sheet, for example, to an appropriate group of testers.

FIG. 8 shows a UI 800 that serves as a signup sheet for testers. To access the signup sheet, testers can click on the link sent by the manager. Of course, other distribution or access channels may be available or used. Once accessed, a tester can enter his or her email alias to gain ownership. Tests that may have been pre-assigned executors in the specification can be displayed as such. Further, the test executor can be changed by updating the appropriate text field on the UI 800. Multiple test executors can be specified for a test variation by separating aliases with semicolons; this could either mean that the same test variation is executed by multiple people, possibly with different product builds, or that it is a complex, multi-platform/machine test. The exemplary signup sheet (the UI 800) also provides some filtering and showing/hiding of test variation details; in addition, a user may choose how many test variations at a time to show on the page and whether all test variations need to be displayed or only those that have not been signed up or otherwise assigned. In comparison to the UI 700 of FIG. 7, notice that variations V98.0 and V107.0 do not appear on the UI 800 of FIG. 8 because they were excluded in the previous filtering step. Also any late-breaking instructions entered during the filtering/publishing process are visible for each applicable test variation.

After signing up for any number of variations in a specification, testers can execute the tests and once executed, they can return to the signup sheet or another sheet enter appropriate test result information. FIG. 9 shows a UI 900 that serves as results acceptor or submission sheet for testers. A tester may click the "Submit Results" button of the UI 900 to submit entered test result information. The submission sheet or form may be directed to show only those variations a tester signed up for along with pass/fail/skipped radio buttons and text areas to provide the product build number actually tested and any additional comments (e.g., operating system information, configuration information, etc.). In this example, test variation details can be expanded or collapsed. Further, an exemplary test service can update the test database with results information entered via the submission sheet, optionally in real time. In the case of multiple testers and personalized submission sheets, each tester can provide a result for the test variation from his/her personalized submission sheet. The tester, if desirable, may also select which platforms/machines were involved in each test variation from, for example, a multi-select list box of the UI 900. The tester may also enter cross-reference ids to other systems such as a bug tracking system or enter free-form text information providing details of a failure or other pertinent details.

As for reporting capabilities, an exemplary test service may show a screen where all test passes are displayed, along with their respective date ranges, descriptions, and cumulative totals of test variations, total numbers of pass/fail, and overall pass/fail percentage. FIG. 10 shows a UI 1000 that displays such information. For example, from the UI 1000, a user may click on any one test run and see the information (total number of tests, total pass/fail numbers and percentage) for all specifications associated with that test run. An exemplary test service may allow the manager to mark a test pass as closed to allow it or summary data to be automatically migrated to an archive facility (e.g., DB 240 of FIG. 2).

Figure 11:
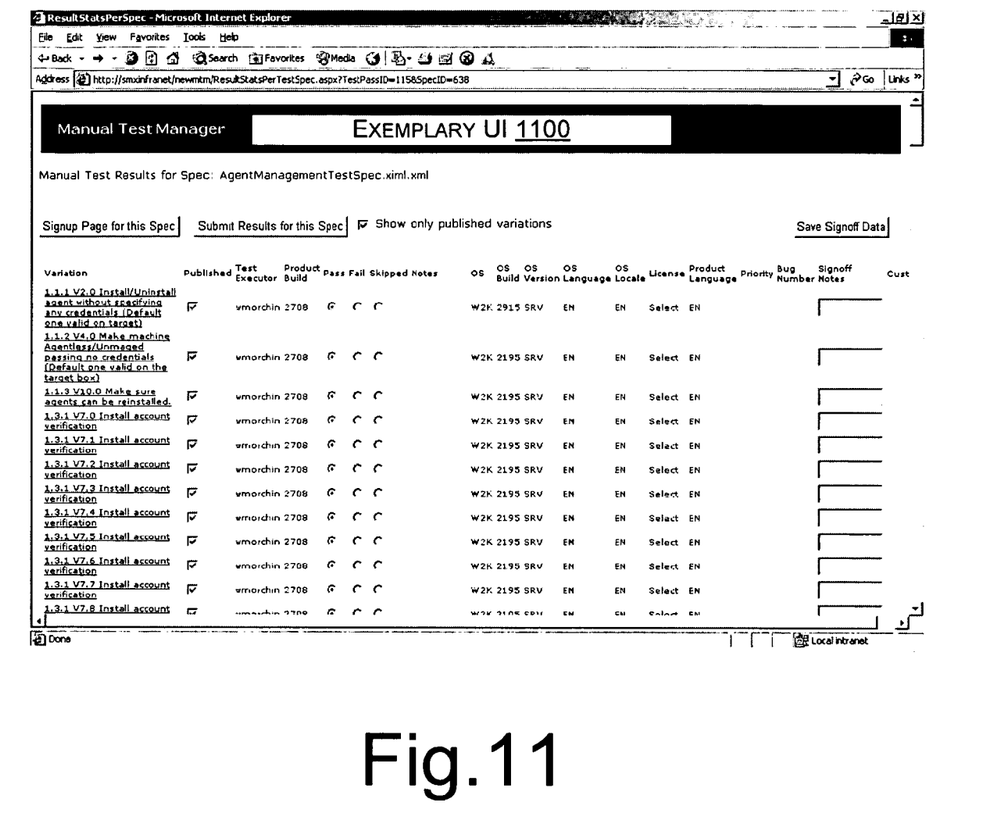
FIG. 11 is an exemplary screen shot of a user interface for managing tests, in particular, to aid in further assessment of test information.

An exemplary test service may allow a user to drill down to results for each individual specification by clicking on the specification title. FIG. 11 shows a UI 1100 that allows a user to further assess results. Through use of the test service, a user may filter the test variations based on any of a number of criteria, as denoted in the top row of the table of the UI 1100. An exemplary test service can also facilitate tracking of signup rate for a given test run by looking at the signup sheets. Also an exemplary UI may display reports of tests skipped, tests not signed-up or incomplete signed-up tests. Such a display may allow a manager to identify who has outstanding tasks and any trends, for example, trends relating to reasons for skipping tests.

An exemplary test service may also allow a manager to review results and optionally mark a failed result as mitigated, mark a passed result as a false positive, mark a test case specification as incorrect indicating a false failure or sign-off the test pass as acceptable for the next stage in the product development cycle.

As described herein an exemplary test service is associated with a test database. The test service can track test passes and associated specifications, along with test ownership and test results of any particular test variation within a particular test specification. An exemplary test service can exposes methods that allow for manual test pass creation; adding/deleting test specifications to/from a manual test pass; publishing a subset of a manual test specifications, for example, for signup by testers; results updating of manual tests; updates on the status of manual tests based on any of a number of criteria. These exemplary methods interact with the database to thereby allow for creation of an accurate, historical record of issues germane to software development. Test managers may use such a record for a variety of purposes such as, but not limited to, quality control, time and resource management, liability/risk management, tester evaluation, etc.

EXEMPLARY COMPUTING ENVIRONMENT

Figure 12:
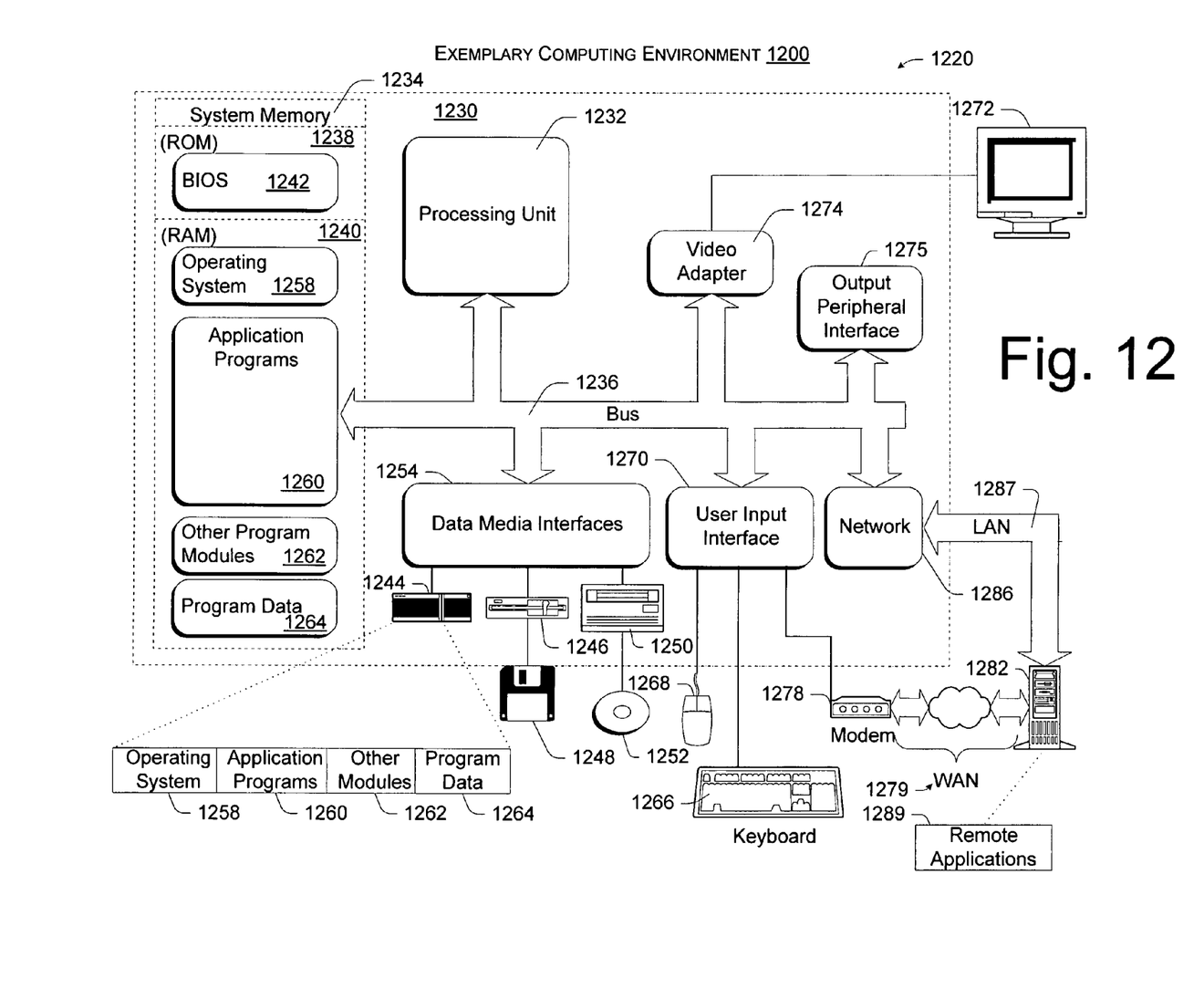
FIG. 12 is a diagram illustrating an exemplary computing environment, which may be used to implement various exemplary test services described herein.

The various examples of an exemplary test service may be implemented in different computer environments. The computer environment shown in FIG. 12 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 12, one exemplary system for implementing an exemplary test service includes a computing device, such as computing device 1200. In a very basic configuration, computing device 1200 typically includes at least one processing unit 1202 and system memory 1204. Depending on the exact configuration and type of computing device, system memory 1204 may be volatile (such as RAM), non-volatile (such as ROM, flash memory, etc.) or some combination of the two. System memory 1204 typically includes an operating system 1205, one or more program modules 1206, and may include program data 1207. This basic configuration is illustrated in FIG. 2 by those components within dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by removable storage 1209 and non-removable storage 1210. Computer storage media may include volatile and nonvolatile, removable and non-removable media implemented in any method or technology for storage of information, such as computer readable instructions, data structures, program modules, or other data. System memory 1204, removable storage 1209 and non-removable storage 1210 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of device 1200. Computing device 1200 may also have input device(s) 1212 such as keyboard, mouse, pen, voice input device, touch input device, etc. Output device(s) 1214 such as a display, speakers, printer, etc. may also be included. These devices are well know in the art and need not be discussed at length here.

Computing device 1200 may also contain communication connections 216 that allow the device to communicate with other computing devices 1218, such as over a network. Communication connection(s) 1216 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method comprising:
   receiving a test specification document file for a software product wherein the test specification document file includes mark-up language;
   calling for storage of the test specification document file in a test database;
   parsing the mark-up language;
   creating test information for manual test variations based at least in part on the parsing of the mark-up language;
   filtering the test information to produce a list of at least some of the manual test variations;
   outputting the list;
   receiving manual test result information based on execution of at least one of the manual test variations on the software product; and
   calling for storage of the manual test result information in the test database.

2. The method of claim 1 wherein the calling for storage of the manual test result information in the test database comprises associating the manual test result information with the test specification document file.

3. The method of claim 1 wherein the mark-up language comprises XML.

4. The method of claim 1 wherein the test database comprises an SQL database.

5. The method of claim 1 wherein the creating test information for manual test variations relies on test information stored in the test database.

6. The method of claim 1 wherein the outputting displays the list of manual test variations using a user interface that allows a user to select one or more of the manual test variations.

7. The method of claim 1 wherein the calling for storage of the test specification document file comprises calling for storage of the file as binary data stored as a single entity.

8. The method of claim 1 wherein the outputting comprises emailing information.

9. The method of claim 8 wherein the emailing comprises emailing a link to a Web site.

10. The method of claim 1 wherein the manual test variations comprise a manual test pass.

11. The method of claim 1 wherein the test database comprises a schema that associates manual test result information with the test specification of the test specification document file.

12. The method of claim 1 further comprising receiving another test specification document file for the software product wherein the test specification document file includes mark-up language and calling for storage of this test specification document file in the test database.

13. The method of claim 1 wherein the test database stores test result information for more than one stored test specification document file for the software product.

14. The method of claim 1 wherein the manual test result information includes information as to the build of the software product.

15. The method of claim 1 wherein the manual test result information includes information as to the software product test execution platform.

16. A system configured to manage software product tests, the system comprising:
   a processor; and
   a memory into which a plurality of instructions are loaded, the plurality of instructions performing a method comprising:
      receiving a test specification document file for a software product wherein the test specification document file includes mark-up language;
      calling for storage of the test specification document file in a test database;
      parsing the mark-up language;
      creating test information for manual test variations based at least in part on the parsing of the mark-up language;
      filtering the test information to produce a list of at least some of the manual test variations;

outputting the list;

receiving manual test result information based on execution of at least one of the manual test variations on the software product; and calling for storage of the manual test result information in the test database.

17. The system of claim 16 wherein the test database uses one or more fields selected from a choice of fields that includes at least a test specification field, a tester field, a test variation field, a test result information field and a software product build field.

18. The system of claim 17 wherein the choice of fields further includes a test pass field, a start date field or an end data field.

* * * * *